US006760367B1

(12) United States Patent
Smyka

(10) Patent No.: US 6,760,367 B1
(45) Date of Patent: Jul. 6, 2004

(54) INTERNAL NOISE IMMUNE DATA COMMUNICATIONS SCHEME

(75) Inventor: Jonathan W. Smyka, Scottsville, NY (US)

(73) Assignee: ENI Technology, Inc., Rochester, NY (US)

( * ) Notice: Subject to any disclaimer, the term of this patent is extended or adjusted under 35 U.S.C. 154(b) by 594 days.

(21) Appl. No.: 09/670,480

(22) Filed: Sep. 26, 2000

(51) Int. Cl.[7] .............................. H04B 1/38; H04L 5/16
(52) U.S. Cl. ...................................... 375/220; 375/259
(58) Field of Search .............................. 375/219, 220, 375/259, 260, 295, 316; 370/505, 464, 366, 300; 714/746

(56) References Cited

U.S. PATENT DOCUMENTS

| 4,635,257 A | * | 1/1987 | Shinohara ..................... 714/24 |
| 6,046,546 A | | 4/2000 | Porter et al. |
| 6,088,752 A | * | 7/2000 | Ahern ......................... 710/303 |
| 6,275,526 B1 | * | 8/2001 | Kim ............................ 375/238 |
| 6,442,135 B1 | * | 8/2002 | Ofek ........................... 370/229 |
| 6,553,073 B1 | * | 4/2003 | Ogata .................... 375/240.28 |

OTHER PUBLICATIONS

Kong, Hyung–Yun; Choi, Won–Ho; Kim, Young–Hwan; Park, Gue–Tae; "Design of an Image Communication System Based on Adaptive Equalizer", The 1999 IEEE Region 10 Conference, vol. 1; Sep. 15–17, 1999; Cheju, Korea; pp. 490–493.

Casali, John G. and Gower, Daniel W.; "Communications Headset Augmentation Via Active Noise Cancellation: Attenuation And Search Intelligibility Performance"; Proceedings of the Human Factors and Ergonomics Society 37TH Annual Meeting; Oct. 11–15, 1993; Seattle, Washington; pp. 554–558.

Ranong, C. NA; Simcock, A.L.; Leung, P.; "A Spread Spectrum Manufacturing Information Network"; The Third International Conference on Manufacturing Engineering 1986; Newcastle; Aug. 4–6, 1986; pp. 118–122.

Bai, Yunfeng/ Zhou, Zucheng; Chen, Junbi; "The Implementation of MIL_STD_1553B Processor"; 1996 2ND International Conference on ASIC Proceedings; Shanghai, China; Oct. 21–24, 1996; pp. 231–234.

* cited by examiner

Primary Examiner—Jean B. Corrielus
(74) Attorney, Agent, or Firm—Harness, Dickey & Pierce, P.L.C.

(57) ABSTRACT

A data communication system and method is presented for communicating data between the internal assemblies of a material processing system. The data communication system includes at least two digital communication ports for communicating data between internal assemblies of the material processing system. A first digital communication port associated with a first internal assembly in interconnected via a physical link to a second digital communication port associated with a second internal assembly. The first digital communication port includes a serial transmitter for converting the data to a transmit serial stream having at least one information frame. A signal generator formats the transmit serial stream as a transmit signal to be transmitted over the physical link to the second digital communication port. The second digital communication port includes a signal converter for receiving the transmit signal from the first digital communication port and generating a receive serial stream therefrom. A serial receiver processes the serial stream and extracts the at least one information frame therefrom.

16 Claims, 5 Drawing Sheets

INTERNAL NOISE IMMUNE DATA COMMUNICATIONS SCHEME

BACKGROUND AND SUMMARY OF THE INVENTION

The present invention relates generally to material processing systems and in particular, to a point-to-point communication scheme employed in a material processing system to provide internal noise immune data communications.

Material processing, such as plasma deposition and sputtering, through the utilization of plasmas has been known for many years. These processes generally require the generation of either an RF or high voltage DC power signal that is coupled to a plasma chamber. Generation of the power signal typically entails chopping and rectifying relatively high voltages such as 270 volts DC. The chopping and rectifying processes generate spurious electric and magnetic fields that couple into nearby circuitry resulting in a relatively high electrical noise environment. The spurious fields that couple into circuitry may cause a degradation in signal quality leading to possible data corruption. High-speed data communication lines are particularly susceptible to signal degradation and data corruption due to the relatively low signal amplitudes required for high-speed communication.

Conventional high-speed data communication systems for material processing systems are based on transmitting analog signals between internal assemblies. Employing analog signals enables high-speed communication at the cost of noise susceptibility and limited error detection capability.

While the prior art can be used to provide internal communications for material processing systems, it has not proven capable of minimizing noise induced errors. In addition, conventional systems have not provided high data transmission rates in concert with detection of corrupted signals.

The present data communication system and method provides a system for communicating data between the internal assemblies of a material processing system. The data communication system includes at least two digital communication ports for communicating data between internal assemblies of the material processing system. A first digital communication port associated with a first internal assembly in interconnected via a physical link to a second digital communication port associated with a second internal assembly. The first digital communication port includes a serial transmitter for converting the data to a transmit serial stream having at least one information frame. A signal generator formats the transmit serial stream as a transmit signal to be transmitted over the physical link to the second digital communication port. The second digital communication port includes a signal converter for receiving the transmit signal from the first digital communication port and generating a receive serial stream therefrom. A serial receiver processes the serial stream and extracts the at least one information frame therefrom.

For a more complete understanding of the invention, its objects and advantages, reference may be had to the following specification and to the accompanying drawings.

DETAILED DESCRIPTION OF THE PREFERRED EMBODIMENT

Figure 1:
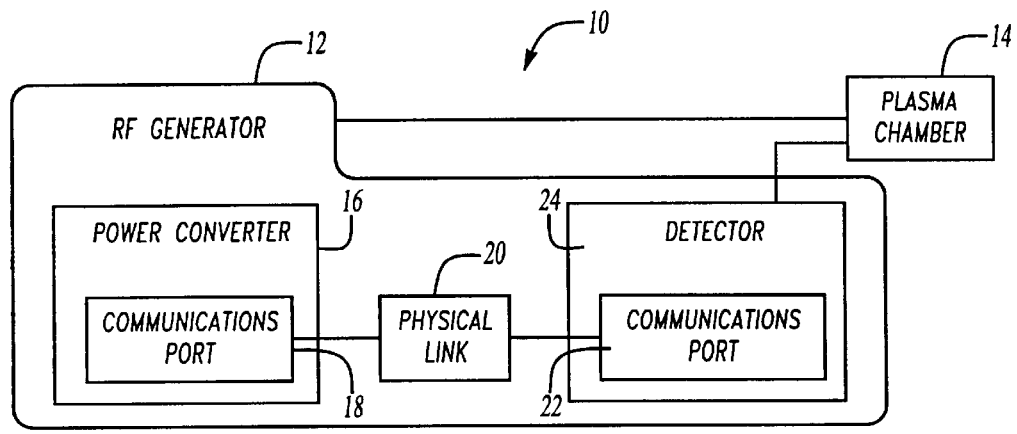
FIG. 1 is an illustration of a presently preferred embodiment of a material processing system in accordance with the teachings of the invention.

Referring to FIG. 1, a material processing system 10 that includes a data communication system according to the present invention is shown. While the present invention is shown and described with a material processing system for manufacturing semiconductors, it will be appreciated that the particular processing system is merely exemplary and could be other material processing systems such as a DC sputtering system for manufacturing compact disks, copper plating, and thin films processing. The processing system 10 includes an RF generator 12 for supplying an RF power signal to drive the plasma processing operation within a plasma chamber 14. The RF power signal in the presently preferred embodiment operates a fundamental frequency of 13.56 MHz, however the scope of invention encompasses processing systems operating at DC as well as other AC frequencies. The RF generator 12 includes various internal assemblies that combined together provide the RF power signal. One of the RF generator internal assemblies is a power converter 16 for converting unregulated input power to an output that supplies RF power to plasma chamber 14. Included within the power converter 16 is a communications port 18 for communicating with another internal assembly of the plasma processing system 10. The power converter communications port 18 provides reliable communications with another assembly within a high noise environment such as that presented by the material processing system 10. A detector assembly 24 within the material processing system 10 monitors the RF power signal at the plasma chamber 14 and couples the sensed information from an internal detector assembly communications port 22 through a physical link 20 to the power converter communications port 18. The physical link 20 is comprised of a suitable connector and cable interconnect scheme linking the two communications ports 18 and 22.

Figure 2:
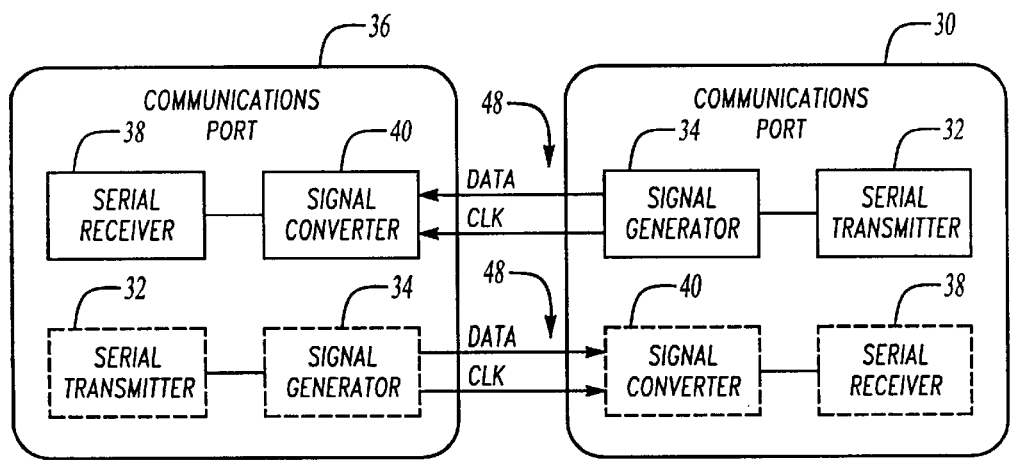
FIG. 2 illustrates a presently preferred embodiment of a communication system in accordance with the teachings of the invention.

Referring to FIG. 2, an embodiment of two interconnected communications ports within a material processing system 10 is illustrated. A first communications port 30 for transmitting information is located on an internal assembly, such as a power converter. The first communications port 30 includes a serial transmitter 32 coupled to a signal generator 34. The serial transmitter 32 formats an input data stream into a serial stream of one or more information frames. The signal generator 34 converts the serial stream to a differential output signal having a DC bias of approximately 1.2 volts with a voltage swing of about 0.4 volts peak-to-peak.

A second communications port 36 for receiving information is located on another internal assembly such as a detector. The second communications port 36 includes a signal converter 40 for receiving the differential signals transmitted from the first communications port 30. The signal converter 40 reformats the differential signal to a single ended signal that is coupled to a serial receiver 38. The serial receiver 38 converts the serial stream of information frames to a format, such as a parallel stream, that is compatible with circuitry on the associated internal assembly.

The communications ports 30 and 36 are cross coupled via a physical link 48 that connects the signal generator 34 of one communications port 31 to the signal converter 40 of the other communications port 13. Suitable physical links 48 includes cable links, wireless links, and fiber optic links. The cable link preferably includes Medical Information Bus connectors at both assemblies coupled through a shielded category 5 cable having a nominal characteristic impedance of 100 ohms. The connectors provide 360 degrees of shield termination. Both connectors are terminated to provide magnetic field suppression.

An alternative embodiment of the invention employs a fiber optic link as the physical link 48. The fiber optic link is preferably an AC coupled, multimode, plastic optical fiber. The alternative embodiment is similar to the embodiment described above and illustrated in FIG. 2, except the clock is encoded into the data of the transmitted signal and the signal generator 34 and signal converter 40 include additional functions for encoding/decoding the transmitted signal. Specifically, the signal generator 34 includes encoding the clock into the data preferably using an 8B/10B encoding scheme. The encoded data is transmitted over the fiber optic link to the signal converter 40 of the communications port 36. The signal converter 40 decodes the transmitted signal extracting the clock from the data.

Figure 3:
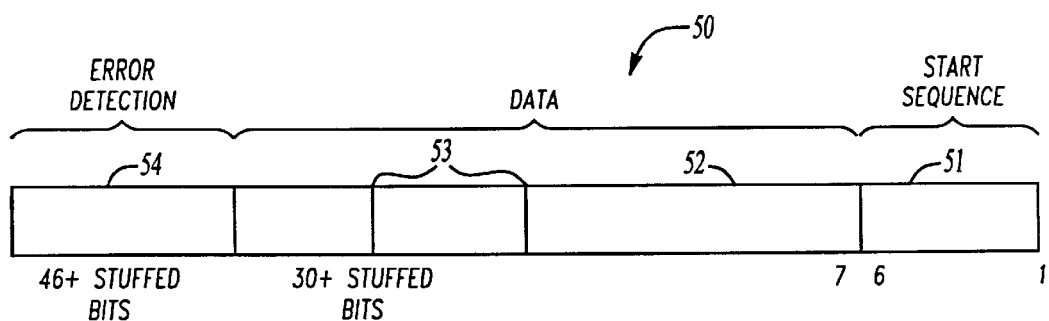
FIG. 3 is an illustration of a presently preferred information frame.

Referring to FIG. 3, an information frame 50 in accordance with the principles of the invention is illustrated. The information frame 50 is subdivided into several regions for holding predefined information. A start sequence 51 for marking the beginning of an information frame occupies the first six bits of the information frame 50. The start sequence 51 in the presently preferred embodiment is comprised of a predetermined sequence of bits consisting of five ones followed by a zero. However, the scope of the invention includes dynamically defining the sequence of bits as well as using a different number of bits as the start sequence. The next 24 bits of the information frame 50 are reserved for data 52 that is communicated between the internal assemblies. Those skilled in the art will readily recognize that various bit lengths of data 52 may be included within the information frame 50. In addition to the 24 bits of data there may be stuffed bits 53 that are inserted into the data 52 if a sequence of data bits is similar to the start sequence 51. The stuffed bits 53 are selected to be the opposite value of what would cause a series of data bits to be mistakenly identified as the start sequence 51. For example, if in the presently preferred embodiment a series of five ones is detected within the data 52, a one would be stuffed into the data stream before the next data bit, thereby ensuring that the start sequence 51 is not repeated within the data 52. The final 16 bits are a CRC code that provides error detection of the data 52. Although CRC error detection is preferably used, it is within the scope of the invention to use other error detection correction schemes such as Checksum, Hamming, and BCH (Bose, Charudhuri, Hocquenghem). In addition, it is within the scope of the invention to include the start sequence 51 within the error detection calculation.

Figure 4:
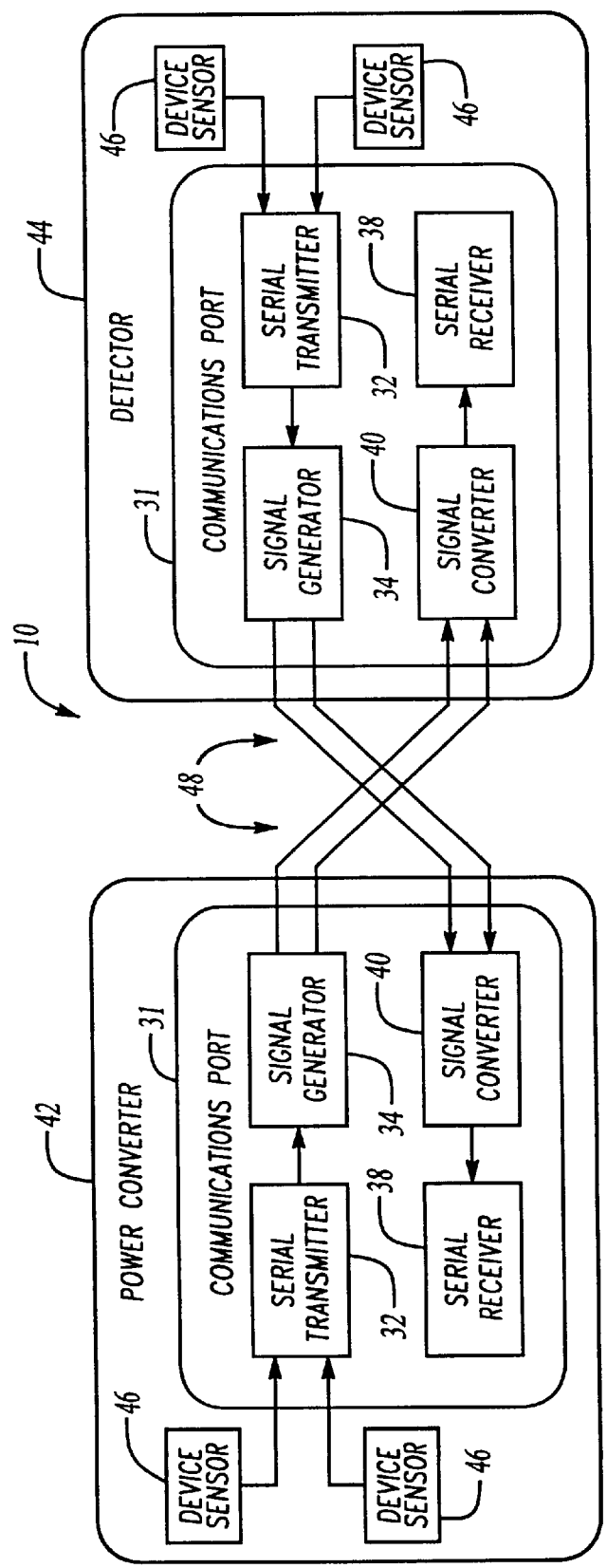
FIG. 4 is a detailed block diagram of a presently preferred embodiment of a material processing system.

Referring to FIG. 4, a presently preferred embodiment of a material processing system 10 employing a digital data communications scheme in accordance with the teachings of the invention is illustrated. Two internal assemblies 42 and 44 of the material processing system 10 each include a communications port 31 to provide bidirectional noise immune communications between those assemblies. The internal assemblies 42 and 44 communicate data that is received from several device sensors 46. In the presently preferred embodiment, the communications port 31 is implemented in a field programmable gate array (FPGA), however the scope of invention includes implementing the communications port 31 in a programmable logic device, microprocessor, or application-specific integrated circuit as well as with discrete devices.

The communications ports 31 are cross coupled via a physical link 48 that connects the signal generator 34 of one communications port 31 to the signal converter 40 of the other communications port 13. The physical link 48 in the presently preferred embodiment is preferably a cable link, however employing a fiber optic link is within the scope of the invention. The cable link includes Medical Information Bus connectors at both assemblies coupled through a shielded category 5 cable having a nominal characteristic impedance of 100 ohms. The connectors provide 360 degrees of shield termination. Both connectors are terminated to provide magnetic field suppression. The scope of the invention is not limited to using the above-mentioned connectors and cable. Instead the invention includes any suitable connector and cable scheme that provides an electrical connection. An alternative embodiment of the invention employs a fiber optic linking has the physical link 48. The fiber optic link is preferably an AC coupled, multimode, plastic optical fiber.

Each communications port 31 includes a serial transmitter 32 coupled to a signal generator 34 for transmitting data received from the device sensors 46. The serial transmitter 32 formats an input data stream into a serial stream of information frames with an associated clock signal for synchronizing. The signal generator 34 converts the serial stream and clock signal to a pair of differential output signals having a DC bias of approximately 1.2 volts with a voltage swing of about 0.4 volts peak-to-peak. Although the output signals are preferably differential with a voltage swing of about 0.4 volts peak-to-peak, it is within the scope of the invention for the output signals to be single-ended and have a voltage swing up to and including 5 volts peak-to-peak.

A signal converter 40 receives data transmitted via the physical link 48. The signal converter 40 reformats the differential signals to a pair of single ended signals comprising the serial stream and the associated clock signal. The reformatted signals are coupled to a serial receiver 38. The serial receiver 38 uses the clock signal to reconstruct the data from the information frames and convert the serial stream to a format, such as a parallel stream, that is compatible with circuitry on the associated internal assembly.

Figure 5:
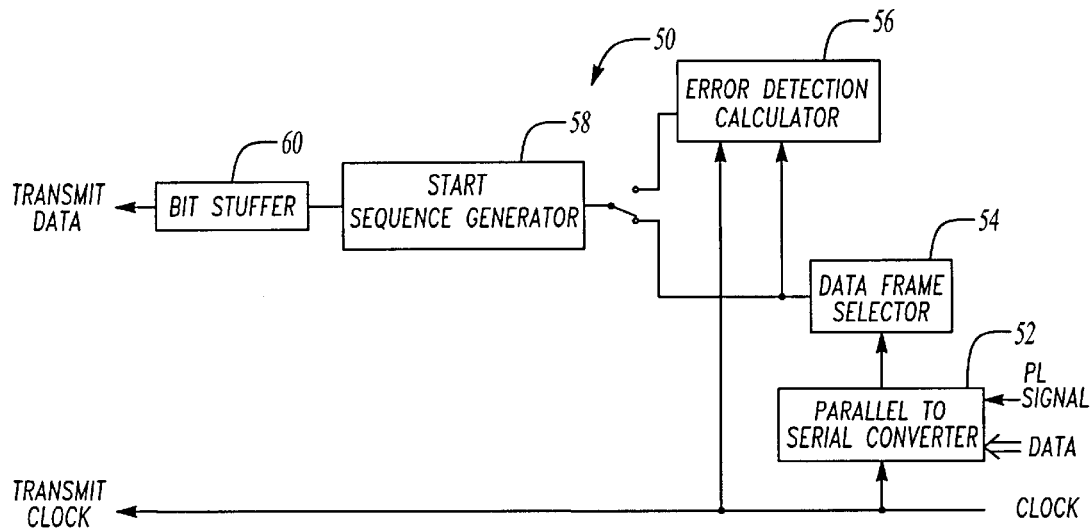
FIG. 5 is a block diagram of a serial transmitter in accordance with the teachings of the invention.

Referring to FIG. 5, a block diagram of a serial transmitter 50 in accordance with the teachings of the present invention is illustrated. A parallel to serial converter 52 converts data to a serial stream in response to a parallel load (PL) signal and a clock signal. The serial stream is coupled to a data frame selector 54 that selects a predetermined number of bits to be transmitted in each information frame. In the presently preferred embodiment, 24 bits of data is transmitted in each information frame. An error detection calculator 56 computes a CRC value corresponding to each frame of data. Although a CRC value is preferably computed, it is within the scope of the invention to compute other error detection values corresponding with other error detection schemes. A start sequence generator 58 receives the data frames and appends a sequence of bits to the beginning of each information frame identifying the start of that frame. In the presently preferred embodiment, the start sequence is predefined as being five ones followed by a zero. However, dynamically defining the start sequence is within the scope of the invention. A bit stuffer 60 coupled to the start sequence generator 58 inserts a bit into the data stream when a sequence of bits that are similar to the start sequence is detected.

Figure 6:
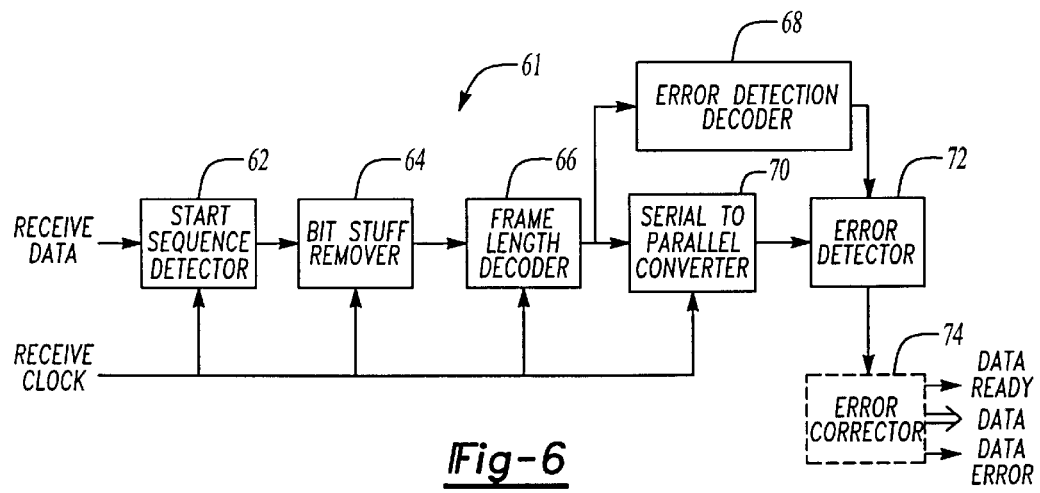
FIG. 6 is a block diagram of a serial receiver in accordance with the teachings of the invention.

Referring to FIG. 6, a block diagram of a serial receiver 61 in accordance with the teachings of the present invention is illustrated. A start sequence detector 62 receives data and a clock signal from the signal converter 40. The start sequence detector 62 monitors the data stream for a sequence of bits identifying the start of an information frame. A bit stuff remover 64 receives the stream of identified information frames and detects bits have been inserted into the data by the bit stuffer 60. A frame length decoder 66 is coupled to the bit stuff remover 64. The frame length decoder 66 decodes the length of the data within the information frames. An error detection decoder 68 and serial to parallel converter 70 are coupled to the frame length decoder 66. The error detection decoder 68 decodes each data frame to determine whether the proper error detection value is contained in the data. The serial to parallel converter 70 converts the serial data stream to a parallel stream. An error detector 72 is coupled to the error detection decoder 68 and serial to parallel converter 70. The error detector 72 evaluates the decoded error detection value to determine whether an error has occurred during transmission of the data. Although, error correction is not included in the presently preferred embodiment, preferably an error corrector 74 is coupled to the error detector 72 for correcting any detected errors. The error corrector 72 outputs the reformatted and error corrected data as well as a data ready signal and a data error signal.

Figure 7:
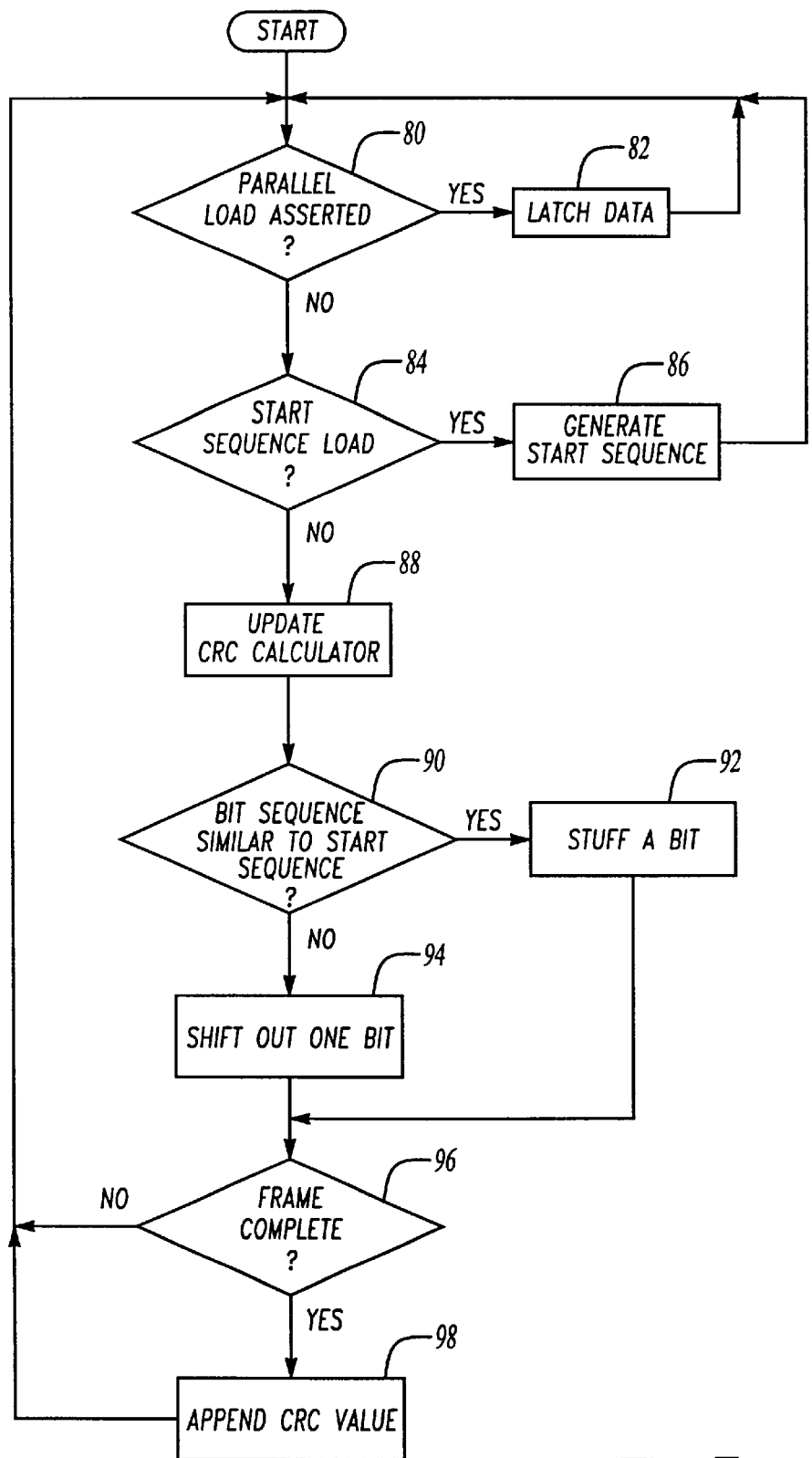
FIG. 7 is a flow diagram of a presently preferred embodiment of a serial transmitter.

With reference to FIG. 7, a flow diagram of the operation of the serial transmitter 50 is illustrated. At decision block 80, whether a parallel load signal has been asserted is determined. If a parallel load signal has been asserted, data is latched, step 82, and control returns to the start of the process. If the parallel load signal has not been asserted the process advances to decision block 84 in which the start sequence load is evaluated. If start sequence load is asserted, then a start sequence is generated, step 86, and control returns to the start of the process. If start sequence load is not asserted, then the CRC calculation is updated, step 88. The process then advances to decision block 90 in which the data stream is evaluated to determine if a sequence of bits is similar to the predetermined start sequence. If there is a bit sequence that is similar to the start sequence, then a bit is stuffed into the data stream to ensure that the start sequence is not duplicated within the data stream, step 92. If a similar sequence is not detected, then one bit is shifted out, step 94. Computing the CRC value as the bits are shifted out increases the speed of the process and eliminates the need for intermediate storage of the data frame. Decision block 96 follows the bit stuffing sequence. At decision block 96 whether a complete frame of data has been shifted out is determined. If the data frame is not complete, control returns to the start of the process. If the data frame is complete, the CRC value is appended to the information frame at step 98, and control returns to the start of the process.

Figure 8:
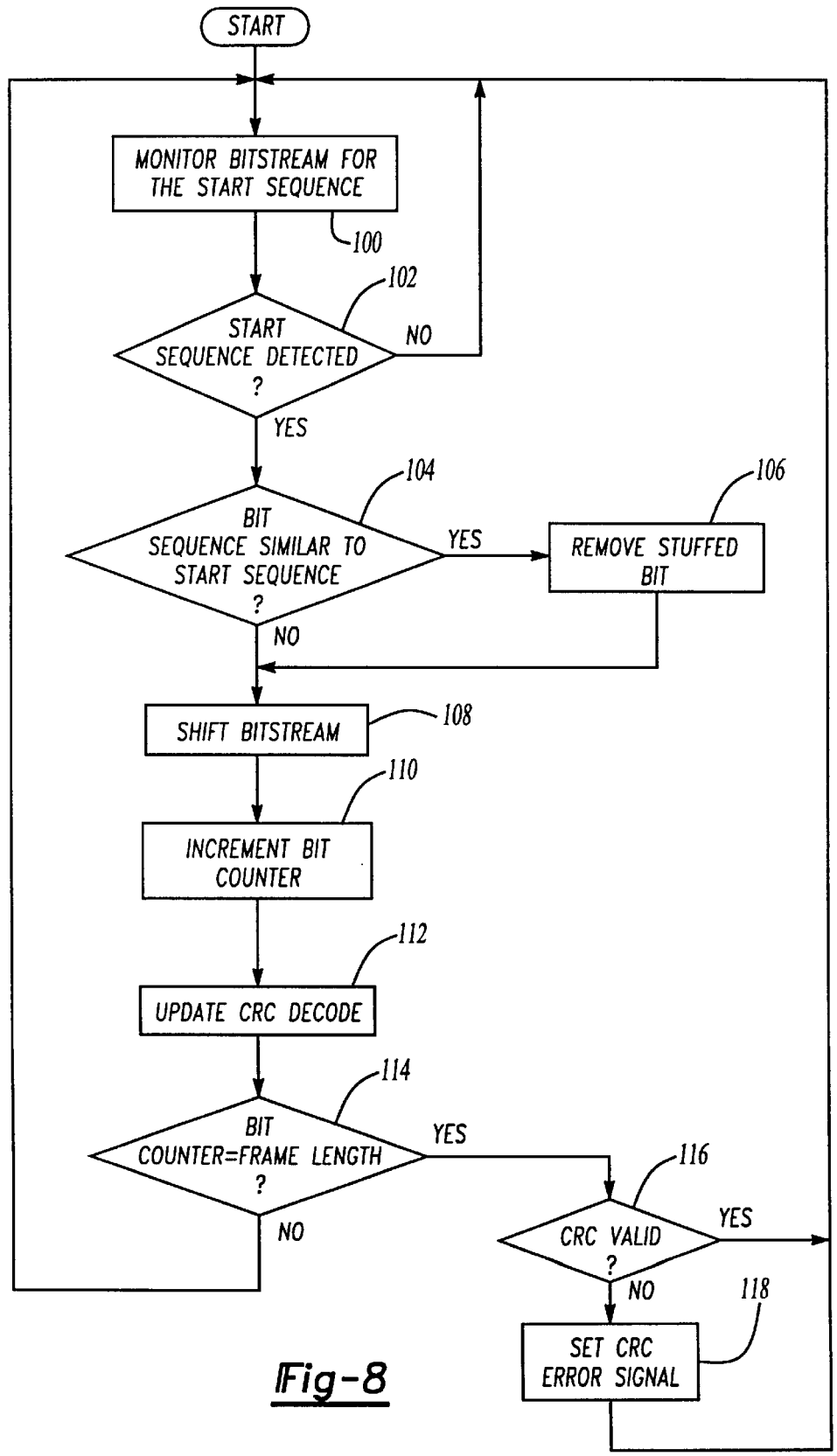
FIG. 8 is a flow diagram of a presently preferred embodiment of a serial receiver.

Referring to FIG. 8, a flow diagram of the operation of the serial receiver is illustrated. At step 100, the bit stream is monitored for the start sequence. At decision block 100, if the start sequence is not detected control returns to the start the process. If the start sequence is detected in the bit stream the process advances to decision block 104 where the data bits are evaluated to determine if the bit sequence is similar to the start sequence. If a similar bit sequence is found, the stuffed bit is removed at step 106. The bit stream is then shifted to the next bit at step 108. The bit counter is then incremented to reflect that the bit stream has been shifted, step 110. At step 112 the CRC decoder is updated. At decision block 114 the bit counter is compared to the frame length to determine if all of the data bits in the data frame have been shifted in. If the data frame is not complete, control returns to the start of process. If the data frame is complete, then decision block 116 is evaluated to determine whether the CRC value is valid. If the CRC value is valid control returns to the start of process. If the CRC value is not valid, the CRC error signal is set at step 118 and then control is returned to the start of process.

The data communications scheme of the present invention provides a high-speed communications port between internal assemblies of a material processing system. The scheme provides noise tolerant communications that reduce data corruption. In addition, the scheme provides serializing and deserializing of data, as well as data synching and error detection. In another aspect of the invention provides a start sequence to identify the beginning of information frames and an associative bit stuff mechanism to allow proper sync between transmitter and receiver.

Thus it will be appreciated from the above that as a result of the present invention, a data communication system and method for a material processing system is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A data communication system for communicating information internal to a material processing system, the data communication system comprising:

at least two digital communication ports for communicating data between internal assemblies of the material processing system;

a first digital communication port associated with a first internal assembly, and a second digital communication port associated with a second internal assembly;

a physical link interconnecting the digital communication ports;

the first digital communication port including:

a serial transmitter for converting the data to a transmit serial stream having at least one information frame, wherein the serial transmitter further includes:

a start sequence generator for appending a start sequence to the information frame, the start sequence including a set of bits indicating the start of the information frame;

an error detection calculator for calculating an error detection value associated with the information frame, the error detection value being appended to the information frame; and a bit stuffer for inserting a bit into the transmit serial stream when a bit pattern is detected that is similar to the start sequence; and a signal generator to format the transmit serial stream as a transmit signal to be transmitted over the physical link to the second digital communication port;

the second digital communication port including:
    a signal converter for receiving the transmit signal from the first digital communication port and generating a receive serial stream therefrom; and
    a serial receiver for processing the receive serial stream and extracting the at least one information frame therefrom, wherein the serial receiver further includes:
        a start sequence detector for detecting a set of bits indicating the start of the information frame;
        an error detection decoder for determining whether the information frame contains an error; and
        a bit stuff remover for detecting and removing a bit inserted into the transmit serial stream by the bit stuffer.

2. The data communication system of claim 1 wherein the error detection value is a CRC value that is calculated based upon the data in the information frame.

3. The data communication system of claim 1 wherein the start sequence is a predetermined sequence of bits.

4. The data communication system of claim 1 wherein the serial transmitter further includes a parallel to serial converter for generating the transmit serial stream from a parallel input stream.

5. The data communication system of claim 1 wherein the transmit signal is transmitted as a low voltage differential signal;
    the transmit low voltage differential signal comprises a transmit data signal and a transmit clock signal;
    the transmit data signal including the at least one information frame; and
    the transmit clock signal for clocking the data.

6. The data communication system of claim 1 wherein the transmit signal is transmitted as a single-ended signal and wherein the transmit signal comprises a transmit data signal having a transmit clock encoded into the data.

7. The data communication system of claim 1 wherein the serial receiver further includes an error correction generator activable in response to detecting an error in the information frame to correct the error.

8. The material processing system of claim 1 further comprising a radio frequency (RF) generator and wherein the first internal assembly comprises a first component of the RF generator and the second internal assembly comprises a second component of the RF generator.

9. A data communication system for communicating information internal to a material processing system, the data communication system comprising:
    at least two digital communication ports for communicating data between internal assemblies of the material processing system;
    a digital communication port associated with a first internal assembly, and another digital communication port associated with a second internal assembly;
    a physical link interconnecting the digital communication ports;
    the at least two digital communication ports including:
        a serial transmitter for converting the data to a transmit serial stream having at least one information frame, wherein the serial transmitter further includes:
            a start sequence generator for appending a start sequence to the information frame, the start sequence including a set of bits indicating the start of the information frame; and
            an error detection calculator for calculating an error detection value associated with the information frame, the error detection value being appended to the information frame; and
            a bit stuffer for inserting a bit into the transmit serial stream when a bit pattern is detected that is similar to the start sequence; and
            a signal generator to format the transmit serial stream as a transmit signal to be transmitted over the physical link;
        a signal converter for receiving the transmit signal and generating a receive serial stream therefrom; and
        a serial receiver for processing the serial stream and extracting the at least one information frame therefrom, wherein the serial receiver further includes:
            a start sequence detector for detecting a set of bits indicating the start of the information frame;
            an error detection decoder for determining whether the information frame contains an error; and
            a bit stuff remover for detecting and removing a bit inserted into the transmit serial stream by the bit stuffer.

10. The data communication system of claim 9 wherein the start sequence is a predetermined sequence of bits.

11. The data communication system of claim 10 wherein the transmit signal is transmitted as a transmit low voltage differential signal;
    the transmit low voltage differential signal comprises a transmit data signal and a transmit clock signal;
    the transmit data signal including the at least one information frame; and
    the transmit clock signal for clocking the data.

12. The data communication system of claim 11 wherein the error detection value is a CRC value that is calculated based upon the data in the information frame.

13. The data communication system of claim 12 wherein the serial receiver further includes an error correction generator activable in response to detecting an error in the information frame to correct the error.

14. The material processing system of claim 9 further comprising a radio frequency (RF) generator and wherein the first internal assembly comprises a first component of the RF generator and the second internal assembly comprises a second component of the RF generator.

15. A method of communicating data internally within a material processing system, the data communication method comprising the steps of:
    providing two digital communication ports for communicating data between internal assemblies of the material processing system;
    interconnecting the digital communication ports to a physical link;
    at one digital communication port:
        converting the data to a transmit serial stream having at least one information frame;
        appending a start sequence to the at least one information frame, the start sequence including a set of bits indicating the start of the information frame;
        calculating an error detection value associated with the information frame;
        appending the error detection value to the information frame;
        stuffing a bit into the transmit serial stream when a bit pattern is detected that is similar to the start sequence
        formatting the transmit serial stream as a transmit signal; and transmitting the transmit signal over the physical link to the other communication port; wherein the step of calculating the error detection value is performed in parallel with the step of transmitting;

at the other digital communication port:
  receiving the transmit signal;
  generating a received serial stream from the transmit signal;
  processing the serial stream;
  extracting the at least one information frame from the serial stream;
  detecting a set of bits indicating the start of the information frame;
  determining whether the information frame contains an error;
  detecting a stuffed bit into the transmit serial stream; and
  removing the stuffed bit from the transmit serial stream.

16. The method of claim 15 wherein the material processing system further comprises an RF generator and wherein the internal assemblies comprise components of the RF generator.

* * * * *